United States Patent
Guerrero et al.

(10) Patent No.: US 11,974,348 B2
(45) Date of Patent: Apr. 30, 2024

(54) CONTROLLING A THERMAL VALVE FOR MELTING OF POLYMERS

(71) Applicant: NORDSON CORPORATION, Westlake, OH (US)

(72) Inventors: Manuel Guerrero, Kennesaw, GA (US); Charles P. Ganzer, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 540 days.

(21) Appl. No.: 16/764,494

(22) PCT Filed: Nov. 6, 2018

(86) PCT No.: PCT/US2018/059413
§ 371 (c)(1),
(2) Date: May 15, 2020

(87) PCT Pub. No.: WO2019/099242
PCT Pub. Date: May 23, 2019

(65) Prior Publication Data
US 2020/0353648 A1    Nov. 12, 2020

Related U.S. Application Data

(60) Provisional application No. 62/587,978, filed on Nov. 17, 2017.

(51) Int. Cl.
*H04W 76/28* (2018.01)
*B29B 13/02* (2006.01)
(Continued)

(52) U.S. Cl.
CPC ........... *H04W 76/28* (2018.02); *B29B 13/022* (2013.01); *H04W 72/23* (2023.01);
(Continued)

(58) Field of Classification Search
CPC .. B29B 13/022; H04W 76/28; H04W 72/042; H04W 36/0088; H04W 36/30; H04W 48/16
See application file for complete search history.

(56) References Cited

U.S. PATENT DOCUMENTS

| 5,814,790 A | 9/1998 | Bondeson et al. |
| 2004/0200858 A1 | 10/2004 | Kappeler et al. |

(Continued)

FOREIGN PATENT DOCUMENTS

| CN | 2420624 Y | 2/2001 |
| CN | 104329566 A | 2/2015 |

(Continued)

*Primary Examiner* — Ryan M Ochylski
(74) *Attorney, Agent, or Firm* — BakerHostetler

(57) ABSTRACT

A method and system for controlling a level of molten material received in a reservoir of a melt system from a melt grid is disclosed. The method includes receiving a first level of the molten material from a sensor in the reservoir at a first time, receiving a second level of the molten material from the sensor at a second time subsequent to the first time, and comparing the second level of the molten material to a desired operating level to determine a difference between the second level and the desired operating level. The method also includes determining a temperature set point for the melt grid based on at least the difference between the second level and the desired operating level, and adjusting an operating temperature of the melt grid to match the temperature set point.

25 Claims, 10 Drawing Sheets

(51) Int. Cl.
    *H04W 72/23*    (2023.01)
    *H04W 36/00*    (2009.01)
    *H04W 36/30*    (2009.01)
    *H04W 48/16*    (2009.01)

(52) U.S. Cl.
    CPC ........ *H04W 36/0088* (2013.01); *H04W 36/30* (2013.01); *H04W 48/16* (2013.01)

(56) References Cited

U.S. PATENT DOCUMENTS

2005/0161468 A1  7/2005  Wagner
2016/0038966 A1  2/2016  Bondeson et al.

FOREIGN PATENT DOCUMENTS

| CN | 104768764 A | 7/2015 |
| CN | 105242063 A | 1/2016 |
| DE | 202006017808 U1 | 2/2007 |
| JP | 60-058282 U | 4/1985 |
| JP | 04-114766 A | 4/1992 |
| JP | 06-072633 U | 10/1994 |
| JP | 2004-276018 A | 10/2004 |
| JP | 2014-083539 A | 5/2014 |

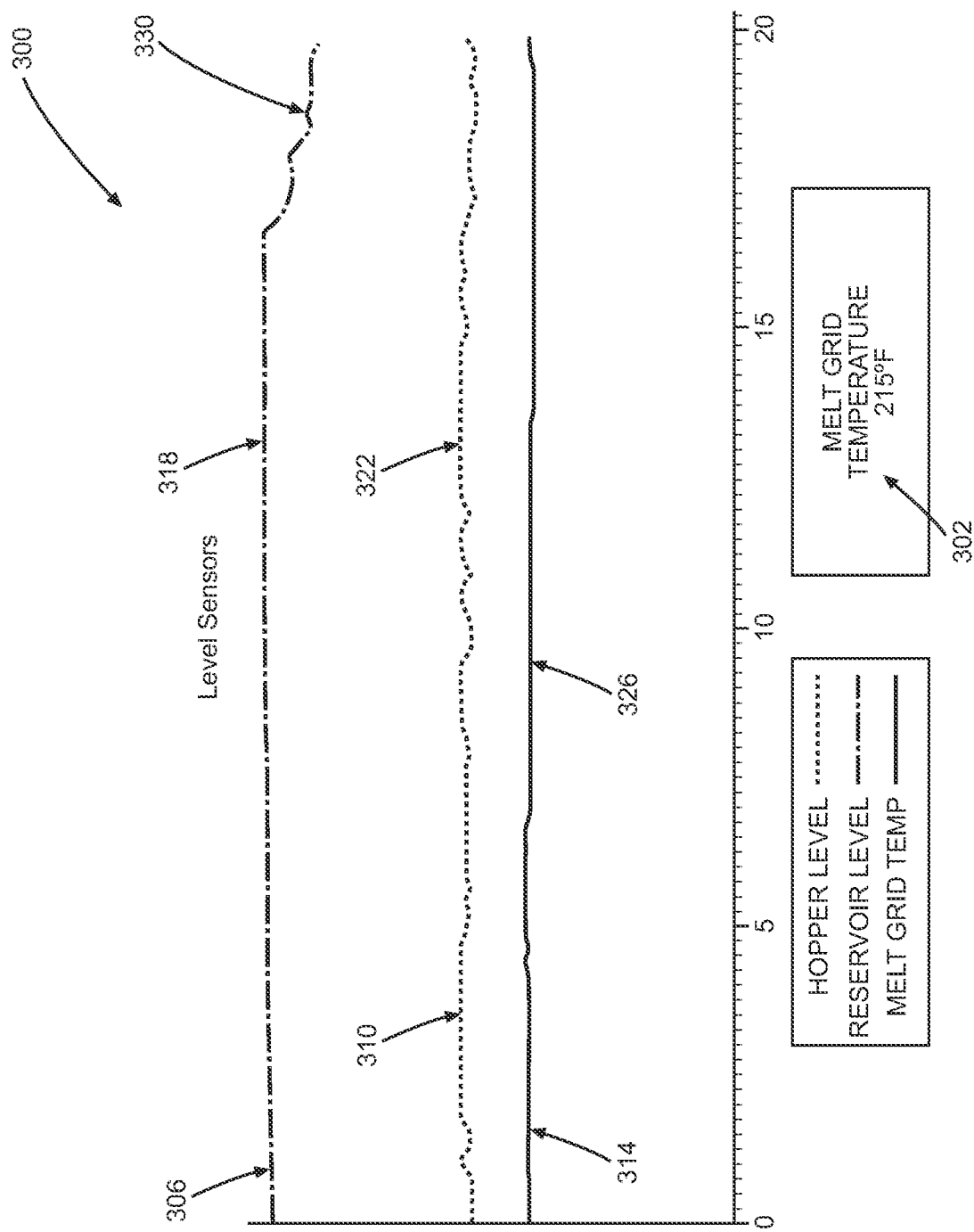

CONTROLLING A THERMAL VALVE FOR MELTING OF POLYMERS

CROSS REFERENCE TO RELATED APPLICATIONS

This application is a U.S. National Stage of International Patent App. No. PCT/US2018/059413, filed Nov. 6, 2018, which claims the benefit of U.S. Provisional Patent App. No. 62/587,978, filed Nov. 17, 2017, the entire disclosures of both of which are hereby incorporated by reference as if set forth in their entireties herein.

TECHNICAL FIELD

The present disclosure relates to a melting system including a melt grid and a control system that dynamically controls the temperature of the melt grid.

BACKGROUND

Conventional melting systems include a melt grid positioned below a hopper, a reservoir positioned below the melt grid, a pump coupled to reservoir, and an applicator coupled to the pump. The melt grid exposes solid polymer material stored in the hopper to an elevated temperature, which converts the polymer material into a melted liquid. The melted liquid is gravity fed to the reservoir where the pump transports the molten liquid to the applicator. The applicator deposits the molten liquid onto a substrate, such as a nonwoven or other material. The top of the hopper has a filling lid that can be opened to add solid polymer material to the hopper as needed.

As solid polymer in the hopper is converted to molten material and molten material in the reservoir is pumped to the applicator, the level of solid polymer in the hopper will decrease and the level of molten material within the reservoir will fluctuate. As such, there is a need for controlling the amount of solid polymer melted by the melt grid. Currently, there are several "melt-on-demand" methods that seek to solve this problem. The most common melt-on-demand arrangement employs a level sensor within the hopper to send a signal to a fill system when the level of solid polymer in the hopper becomes low. Upon receiving the signal, the fill system replenishes the hopper. Another melt-on-demand system includes a demand sensor within the reservoir that regulates a downward force on the solid polymer in the hopper. When the level of molten material in the reservoir becomes low, the demand sensor instructs the force-inducing device to impart a greater downward force on the solid polymer. The demand sensor can also instruct the melt grid to increase its temperature.

However, many of these melt-on-demand systems present issues. For example, in conventional melting systems, solid polymer must be stored in a separate container spaced from the melters, thus requiring increased floor space to accommodate the entire melting system. Also, an air conveyance system capable of transporting the solid polymer from the container to the melter must be included. Off-board storage is necessary in these systems because the melters are incapable of exercising a great deal of control over the amount of solid polymer that is melted at any particular time. This restricts the types of material that can be melted, as some types of materials are not conducive to air conveyance techniques. Further, vapors created by the melting process can collect on surfaces within and around the inlet through which the hopper receives solid polymer from the fill system, which can result in clogs of the inlet and overall system failures. The solid polymer within the hopper may form a bridge when the melt system is idle, which prevents additional material from being melted and sent to the hopper and eventually starves the melt grid and hopper of material.

As a result, there is a need for a melt system that allows for onboard storage of solid polymer and is capable of exercising control over the rate at which solid polymer is melted by the melt grid.

SUMMARY

A first embodiment of the present invention is a method for controlling a level of molten material received in a reservoir of a melt system from a melt grid. The method includes receiving a first level of the molten material from a sensor in the reservoir at a first time, receiving a second level of the molten material from the sensor at a second time subsequent to the first time, and determining a molten fill rate of the molten material from the first and second levels. The method also includes comparing the molten fill rate of the molten material to a molten fill rate threshold to determine a difference between the molten fill rate and the molten fill rate threshold, determining a temperature set point for the melt grid based on at least the molten fill rate, and adjusting an operating temperature of the melt grid to match the temperature set point.

Another embodiment of the present invention is a melt system for melting solid polymer into molten material. The melt system includes a hopper for receiving the solid polymer, a reservoir for receiving the molten material, and a melt grid disposed between the hopper and the reservoir for heating the solid polymer into the molten material. The melt system also includes a sensor disposed in the reservoir for detecting a level of the molten material in the reservoir, and a controller in electrical communication with the melt grid and the sensor for controlling the level of molten material in the reservoir. The controller is configured to receive a first level of the molten material from a sensor in the reservoir at a first time, receive a second level of the molten material from the sensor at a second time subsequent to the first time, and determine a molten fill rate of the molten material from the first and second levels. The controller is further configured to compare the molten fill rate of the molten material to a molten fill rate threshold to determine a difference between the molten fill rate and the molten fill rate threshold, determine a temperature set point for the melt grid based on at least the molten fill rate, and adjust an operating temperature of the melt grid to match the temperature set point.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown.

FIG. 7A is a display of an HMI device showing a graph that depicts reservoir level, hopper level, and melt grid temperature over a first period of time for an embodiment of the present invention;

DETAILED DESCRIPTION OF ILLUSTRATIVE EMBODIMENTS

Figure 1:
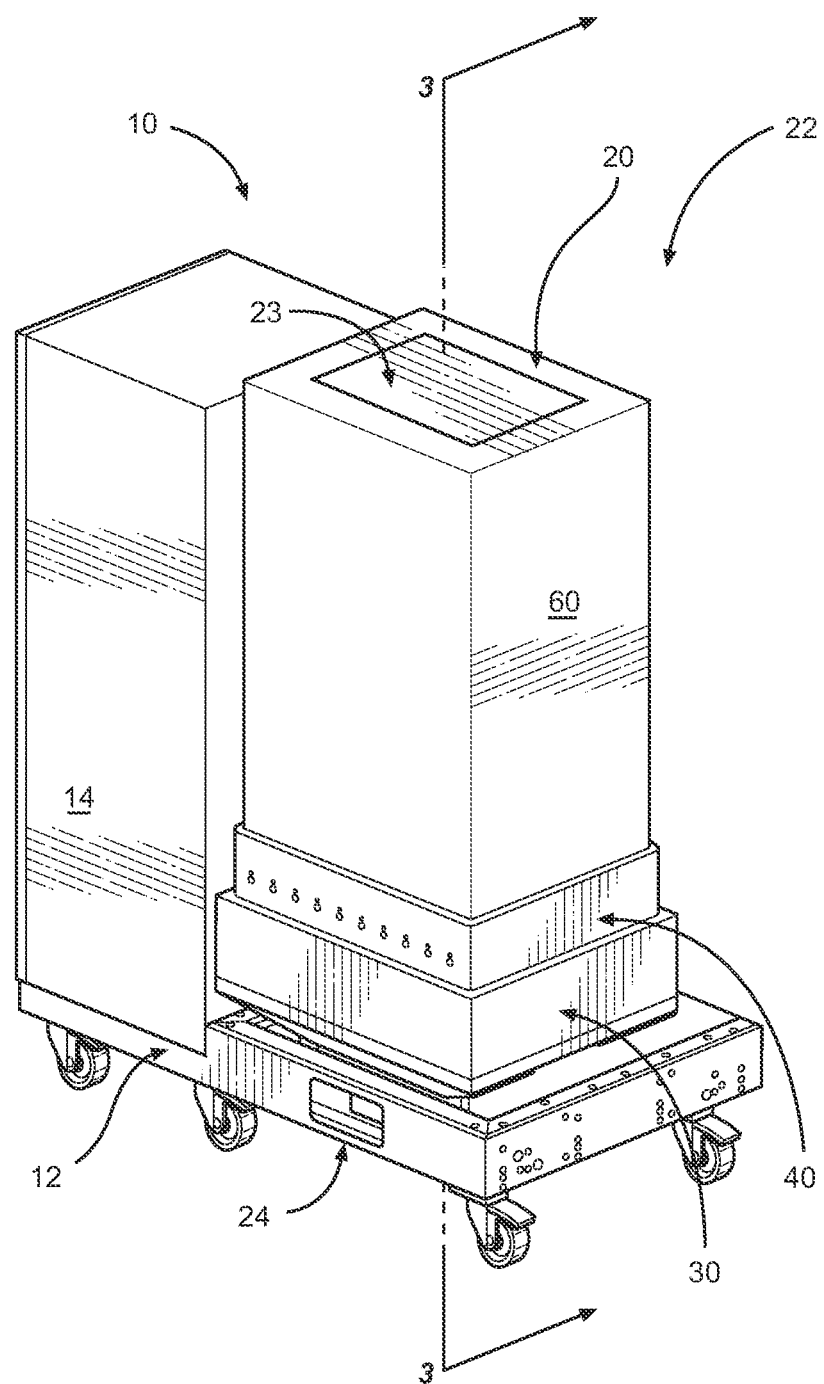
FIG. 1 is a perspective view of a melting system according to an embodiment of the present disclosure.

Described herein is a melting system 10 that includes a melt grid 40 for converting a solid polymer P, such as an adhesive, into a molten material M. The melting system 10 also includes a reservoir 30 for receiving the molten material M from the melt grid 40. The melting system 10 includes a sensor 29 disposed within the reservoir 30 and a controller 402 in communication with the sensor 29 and the melt grid 40 that controls the temperature of the melt grid 40, which determines the amount of molten material M received by the reservoir 30. Certain terminology is used to describe the melting system 10 in the following description for convenience only and is not limiting. The words "right," "left," "lower," and "upper" designate directions in the drawings to which reference is made. The words "inner" and "outer" refer to directions toward and away from, respectively, the geometric center of the description to describe the melting system 10 and related parts thereof. The words "forward" and "rearward" refer to directions in a longitudinal direction 6 and a direction opposite the longitudinal direction 6 along the melting system 10 and related parts thereof. The terminology includes the above-listed words, derivatives thereof, and words of similar import.

Unless otherwise specified herein, the terms "vertical," "lateral," and "longitudinal" are used to describe the orthogonal directional components of various components of the melting system 10, as designated by the vertical direction 2, lateral direction 4, and longitudinal direction 6. It should be appreciated that while the lateral and longitudinal directions 4 and 6 are illustrated as extending along a horizontal plane, and the vertical direction 2 is illustrated as extending along a vertical plane, the planes that encompass the various directions may differ during use.

Figure 2:
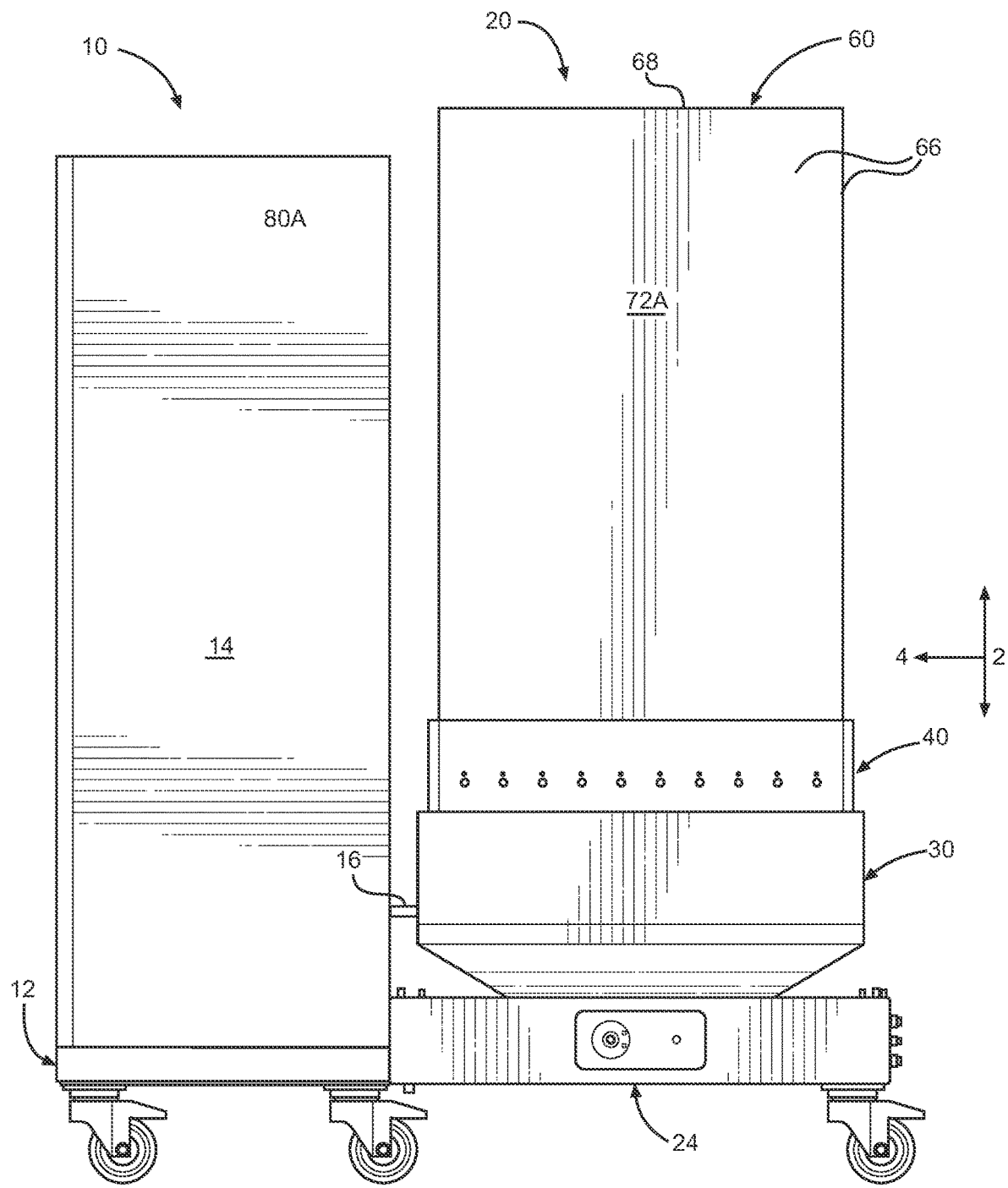
FIG. 2 is a side view of the melting system shown in FIG. 1.

As shown in FIGS. 1 and 2, the melting system 10 generally includes a base frame 12 mounted on wheels (not numbered), a control unit 14 supported by one side of the base frame 12, and at least one melt unit. In accordance with the illustrated embodiment, the melt unit 20 is supported by the side of the base frame 12 opposite the control unit 14. The control unit 14 includes a cabinet that houses controllers, user interfaces, and displays (such as display 300 shown in FIGS. 7A-7C) that an operator can use to control operation of the melting system 10. The control unit 14 is connected to the melt unit 20 via wired connectors 16. Though shown as including a single melt unit, the melting system 10 can include two or more melt units. The principles as described herein can be scaled up or down in size depending on application requirements, such as for nonwoven or packaging applications.

Continuing with FIGS. 1 and 2, the melt unit 20 is supported by the base frame 12 and the underlying surface and extends upward along a vertical direction 2. The melt unit 20 and control unit 14, and thus the base frame 12, define the overall "footprint" of the melting system 10. As illustrated, the footprint is substantially rectilinear and extends along a lateral direction 4 and a longitudinal direction 6 that are perpendicular to each other. The lateral and longitudinal directions 4 and 6 are also perpendicular to the vertical direction 2.

Figure 3:
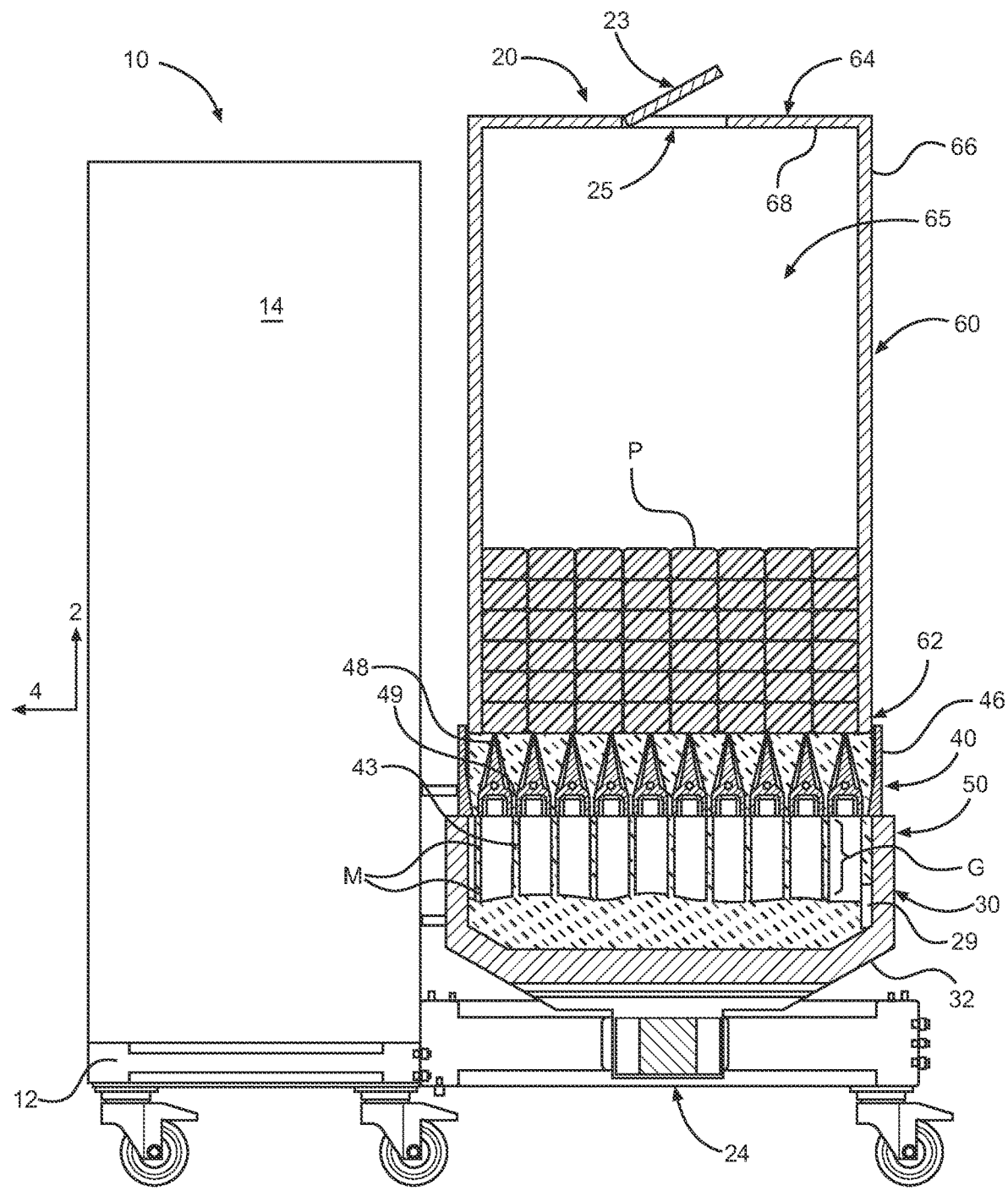
FIG. 3 is a cross-sectional view of a portion of the melting system shown in FIG. 1 taken along line 3-3.
Figure 8:
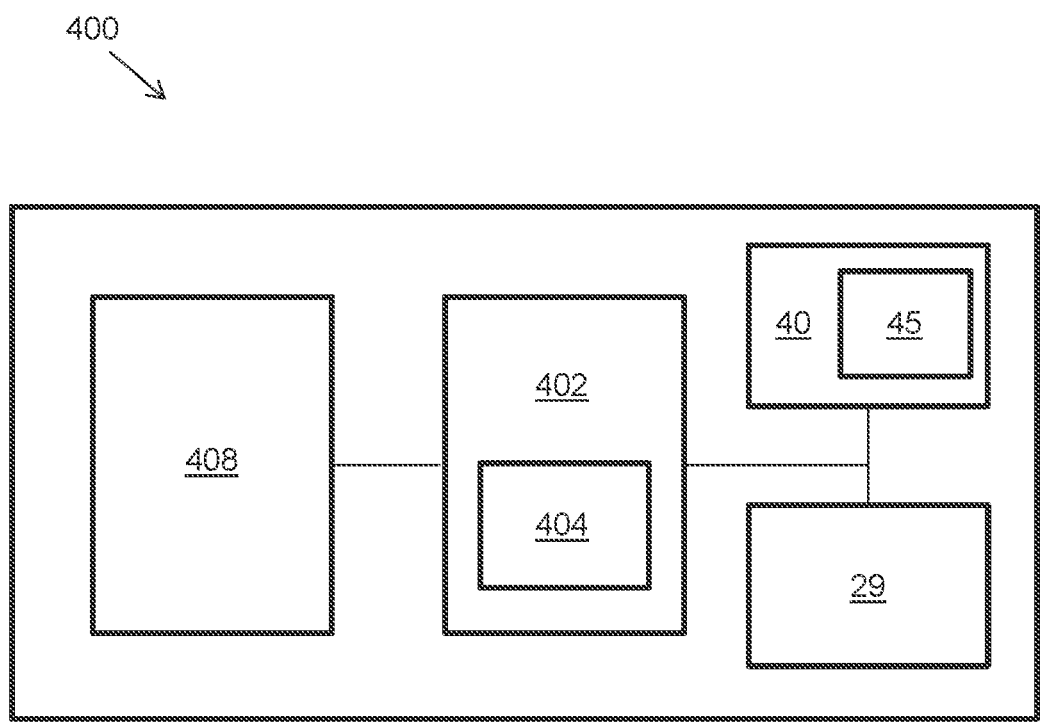
FIG. 8 is a schematic diagram of a control system according to an embodiment of the present invention.

Continuing with FIGS. 1-3, the melt unit 20 includes a pump assembly 24 above the base frame 12, a reservoir 30 coupled to the pump assembly 24, one or more sensors 29 positioned in the reservoir 30, a melt grid 40 above the reservoir 30, and the hopper 60 mounted above the melt grid 40. The sensors 29 can be one or more capacitive level sensors, optical sensors using a camera, and the like. The melt unit 20 also includes a thermal isolation region 50 disposed between the reservoir 30 and the hopper 60. The melting system 10 includes a control system 400 that controls operations of the melt unit 20, particularly the melt grid 40, as shown in FIG. 8. The control system 400 includes a controller 402 coupled to the one or more sensors 29 and the melt grid 40 through the wired connectors 16. The control system 400 is used to control flow of molten material M from the melt grid 40 and into the reservoir 30 as explained below.

Referring to FIGS. 1-3, the thermal isolation region 50 creates a barrier between the molten material M in the reservoir 30 and the solid polymer P in the hopper 60. The thermal isolation region 50 helps maintain the temperature in the hopper 60 below the melting temperature of the solid polymer P. For example, the thermal isolation region 50 helps maintains the solid polymer P in the hopper 60 at a first temperature that is lower than a second temperature of the molten material M in the reservoir 30 by creating a thermal barrier that minimizes heat transfer from the reservoir 30 to the hopper 60 through the melt grid 40. As shown in FIG. 3, the thermal isolation region 50 comprises the gap G between the melt grid 40 and the molten material M in reservoir 30. The thermal isolation region 50 can be any space or structure that creates a thermal barrier to minimize or even eliminate thermal migration from the molten material in the reservoir to the solid polymer P in the hopper. For instance, the thermal isolation region 50 may be an upper portion of the reservoir 30, as shown in FIG. 3. In another embodiment, the thermal isolation region may comprise a separate component positioned between the reservoir 30 and the melt grid 40. In some instances, there may be a thermal isolation region 50 and/or separate component positioned between the hopper 60 and the melt grid 40 (not shown).

Figure 4:
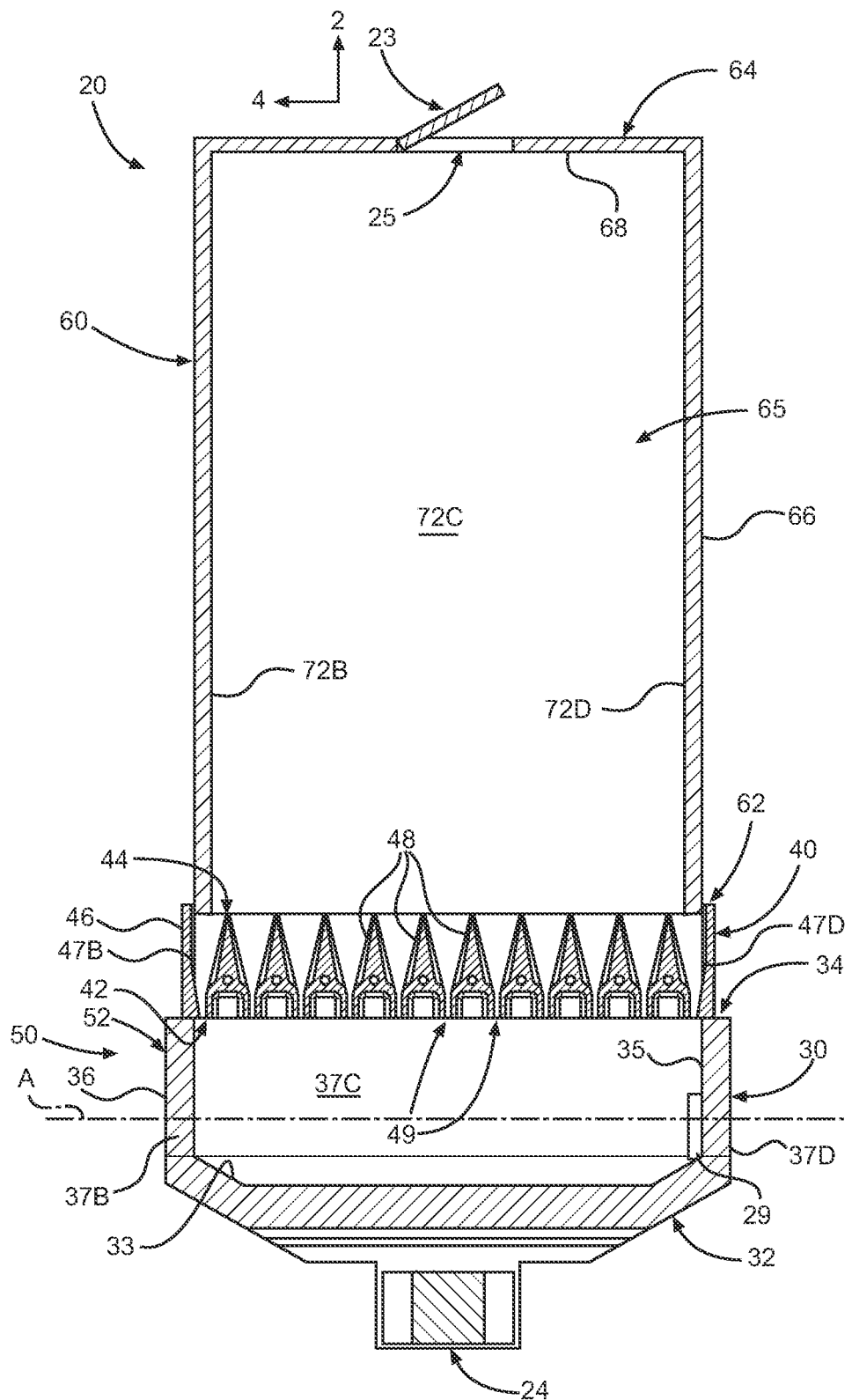
FIG. 4 is a cross-sectional view of the melt unit shown in FIG. 1 with components of the melting system removed for clarity.

Turning to FIGS. 3 and 4, the reservoir 30 captures the molten material M exiting the melt grid 40. The reservoir 30 includes a base 32, a top 34 opposite the base 32 along the vertical direction 2, and an outer wall 36. The outer wall 36 includes four sides: first side 37a (not shown), second side 37b, third side 37c and fourth side 37d. The outer wall 36 defines an inner surface 35 along which the sensor 29 is positioned. The base 32 has an inner surface 33, a portion of which can be angled with respect to the vertical direction 2. The inner surface 33 guides molten material M into a portal (not numbered) that feeds into the pump assembly 24 below the reservoir 30. The amount of molten material M that accumulates in the reservoir 30 is based, in part, on a) the throughput of solid polymer P through the melt grid 40, b) the output of molten material M from the reservoir 30, and c) the height of the outer wall 36.

In accordance with the illustrated embodiment, the thermal isolation region 50 is disposed below the melt grid 40. As shown in FIGS. 3 and 4, the outer wall 36 has a height that is sufficient to facilitate formation of an air gap G between the melt grid 40 and a pool of molten material M that accumulates at the base 32 of the reservoir 30 during operation. As shown, the thermal isolation region 50 comprises, at least in part, the air gap G aligned with an upper portion 52 of the reservoir 30. In this regard, it can be said the thermal isolation region 50 includes the upper portion 52 of the reservoir 30. The upper portion 52 of the outer wall 36 extends from the top 34 of the reservoir 30 to an axis A that extends through the outer wall 36 of the reservoir 30. The axis A is shown at a location above the base 32 of the reservoir 30. The extent of the gap G is selected to separate the bottom of the melt grid 40 from the heated, molten material M in the reservoir 30. The separation creates a thermal barrier that can inhibit or minimize heat transfer from the molten material M to the melt grid 40.

Continuing with FIGS. 3 and 4, the melt grid 40 heats the solid polymer P in the hopper 60 into the molten material M. The melt grid 40 includes a bottom 42 and a top 44 spaced from the bottom 42 along the vertical direction 2. The bottom 42 of the melt grid 40 is mounted to the top 34 of the reservoir 30. The hopper 60 is coupled to the top 44 of the melt grid 40. The melt grid 40 has an outer wall 46 that includes four sides 47a, 47b, 47c and 47d (only 47b and 47d are shown FIG. 4). The melt grid 40 may also include a plurality of parallel and spaced apart melting rails 48. The melting rails 48 extend across the melt grid 40 along the longitudinal direction 6 (into the sheet in FIG. 3). The melting rails 48 define passages 49 that extend between adjacent melting rails 48. The melting rails 48 can have different orientations as needed. In some instances, crossbars (not shown) may connect adjacent melting rails. Each melting rail 48 includes one or more heater elements that elevate the temperature of the melting rails 48 to the desired temperature for processing the solid polymer P. The heating elements are connected to the controller 402 via the wired connector 16. In addition, the melt grid 40 may include guide members 43 coupled to the bottom the melt grid 40. The guide members 43 guide the molten material M as it exits from between the melting rails 48 into the molten material M. The guide members 43 may reduce formation of air bubbles as the molten material M falls from the bottom 42 of the melt grid 40 into the reservoir 30. The melt grid 40 can also include one or more temperature sensors 45 for sensing the current temperature of the melt grid 40 and transmitting that measurement to the controller 402, as will be discussed further below. Though the temperature sensor 45 is depicted as attached to the second side 47b of the melt grid 40, the temperature sensor 45 can alternatively be attached to any of the sides 47a-47d of the melt grid 40. In other embodiments, the temperature sensor 45 can be disposed through the outer wall 46 of the melt grid 40, through one of the melting rails 48, or in other locations as desired.

The melt grid 40 is designed for efficient heating to the desired operating temperature from a cooled state. In one example, the melt grid 40 has a mass selected to provide a watt density of 8-10 w/in$^3$. Such a melt grid may take about 20 minutes to reach its desired operating temperature. In another example, the melt grid 40 has a mass selected to increase watt density and utilizes thin film heaters. In this example, the melt grid 40 has a watt density of 60-70 w/in$^3$. Such a melt grid 40 will take about 3-6 minutes to reach its desired operating temperature. In contrast, conventional melt grids use heavy castings and cartridge heaters and have a watt density of 4-5 w/in$^3$. As a result, conventional melt grids will take 30 or more minutes to reach the desired operating temperature. Accordingly, the melt grids as described herein may be considered low mass melt grids and have a watt density that is greater than 6-8 w/in$^3$ and could be as high as 60-70 w/in$^3$. Such low mass melt grids heat up and cool down faster compared to the conventional melt grids. Faster heat-up and cooling increases operational efficiency by reducing the amount of time the melt unit is not generating molten material but is waiting for the system to reach its desired operational temperatures.

Referring to FIGS. 3-4, the hopper 60 is configured to hold solid polymer P. As illustrated, the hopper 60 has a lower end 62 and an upper end 64 opposite the lower end 62 along the vertical direction 2. The hopper 60 also includes a wall 66 that extends from the lower end 62 to the upper end 64. The upper end 64 includes an upper cover 68 that closes the upper end 64 of the hopper 60. The upper cover 68 can include an access door 23 that may be removable from the upper cover 68, or connected but movable relative to the upper cover 68, such as by a hinge (not shown). The access door 23 covers an opening 25 that extends through the upper cover 68, through which an operator of the melting system 10 can replenish the supply of solid polymer P within the hopper 60. The wall 66 extends around an entirety of the hopper 60 such that the wall 66 and the upper cover 68 define an internal chamber 65 that holds the solid polymer P. The lower end 62 of the hopper 60 is substantially open to the melt grid 40. As shown in FIGS. 3-4, the lower end 62 is open to the melting rails 48 and passages 49 of the melt grid 40.

In accordance with the illustrated embodiment, the wall 66 includes a plurality of sides 72a-72d. As best shown in FIGS. 2 and 4, the wall 66 includes a first side 72a, a second side 72b that intersects the first side 72a, a third side 72c that intersects the second side 72b and is opposite the first side 72a, and a fourth side 72d that intersects the first side 72a (FIG. 2) and the third side 72c. The fourth side 72d is opposite the second side 72b. The first side 72a can be considered the front side or front of the hopper 60 and the third side 72c can be considered the back or back side of the hopper 60. A "side" of the hopper 60 can also be referred to as a side wall in certain embodiments. As shown, the upper cover 68 intersects all four sides 72a-72d. The four sides 72a-72d are arranged to form a rectilinear cross-sectional shaped hopper. Although a rectilinear cross-sectional shaped hopper 60 is illustrated, the hopper 60 can have other cross-sectional shapes. For example, in accordance with an alternative embodiment, the hopper 60 has a tubular shape. In such an embodiment, the hopper 60 includes a wall 66 that forms a tubular shaped body. In such an embodiment, the hopper 60 includes a single curved wall.

The hopper 60 has been described and shown as disposed on top of the melt grid 40 that is separated from the molten material in the reservoir 30 by the thermal isolation region 50 (or the air gap G). The thermal isolation region 50 inhibits heat transfer from the molten material to the solid polymer stored in the hopper 60. However, the hopper 60 as described herein can be used in melting systems with different types of melt grids and reservoir configurations than what is shown and described above. Rather, the hopper 60 can be used in any type of melting system where molten material M and the solid polymer P stored in the hopper 60 are thermally isolated with respect to each other. In other words, embodiments of the present disclosure include a melting system that includes a hopper that is thermally isolated from the reservoir 30 that contains molten material M.

Referring to FIG. 8, the melt unit 20 can be controlled by a control system 400 including a controller 402 and/or an HMI device 408 in communication with the controller 402. The controller 402 may include one or more controllers and may also be referred to as one or more processors. The controller 402 can be entirely contained within the control unit 14, can communicate with the melt unit 20 through the control unit 14, or can communicate with the melt unit 20 directly. The controller 402 and/or the HMI device 408 can be in wired and/or wireless connection with the melt unit 20, and are configured to transmit instructions to the melt unit 20, particularly the melt grid 40, through the wireless and/or wired connection. The controller 402 can be a programmable logic controller (PLC), a microprocessor based controller, a personal computer, or another conventional control device capable of carrying out the functions described herein as understood by a person having ordinary skill in the art. For example, the controller 402 can perform the various methods relating to controlling the melt unit 20 based upon user input, as described in detail below. Additionally, the controller 402 can perform the various methods related to controlling the melt unit 20 based upon a library of operational cycles or sequences that are stored in a memory unit 404 of the controller 402. The memory unit 404 may include one or more memory units, and may also be referred to as a storage device. The operational sequences are recalled and placed in a particular control program, as desired, executing on the controller 402. The operational sequences can be adjusted to accommodate different dispensing operations, different types of substrates, or different types of material, for example through the HMI device 408.

The HMI device 408 is operatively connected to the controller 402 in a known manner. The HMI device 408 may include input devices and controls, such as a keypad, push-buttons, control knobs, a touch screen, etc., and output devices, such as displays and other visual indicators, that are used by an operator to control the operation of the controller 402 and, thereby, control the operation of the melt unit 20. One example of such a display is the display 300 shown in FIGS. 7A-7C, which will be discussed further below. The HMI device 408 may further include an audio output device, such as a speaker, by which an audio alert may be communicated to an operator. Using the HMI device 408, an operator can enter parameters such as type of solid polymer P, desired temperature of the melt grid 40, target reservoir fill level, melt grid 40 idle/shutdown time etc. Additionally, the controller 402 and/or the HMI device 408 can be in wired and/or wireless communication with an external network (not shown), such that the operator can access the controller 402 remotely from a separate system or device.

Figure 5:
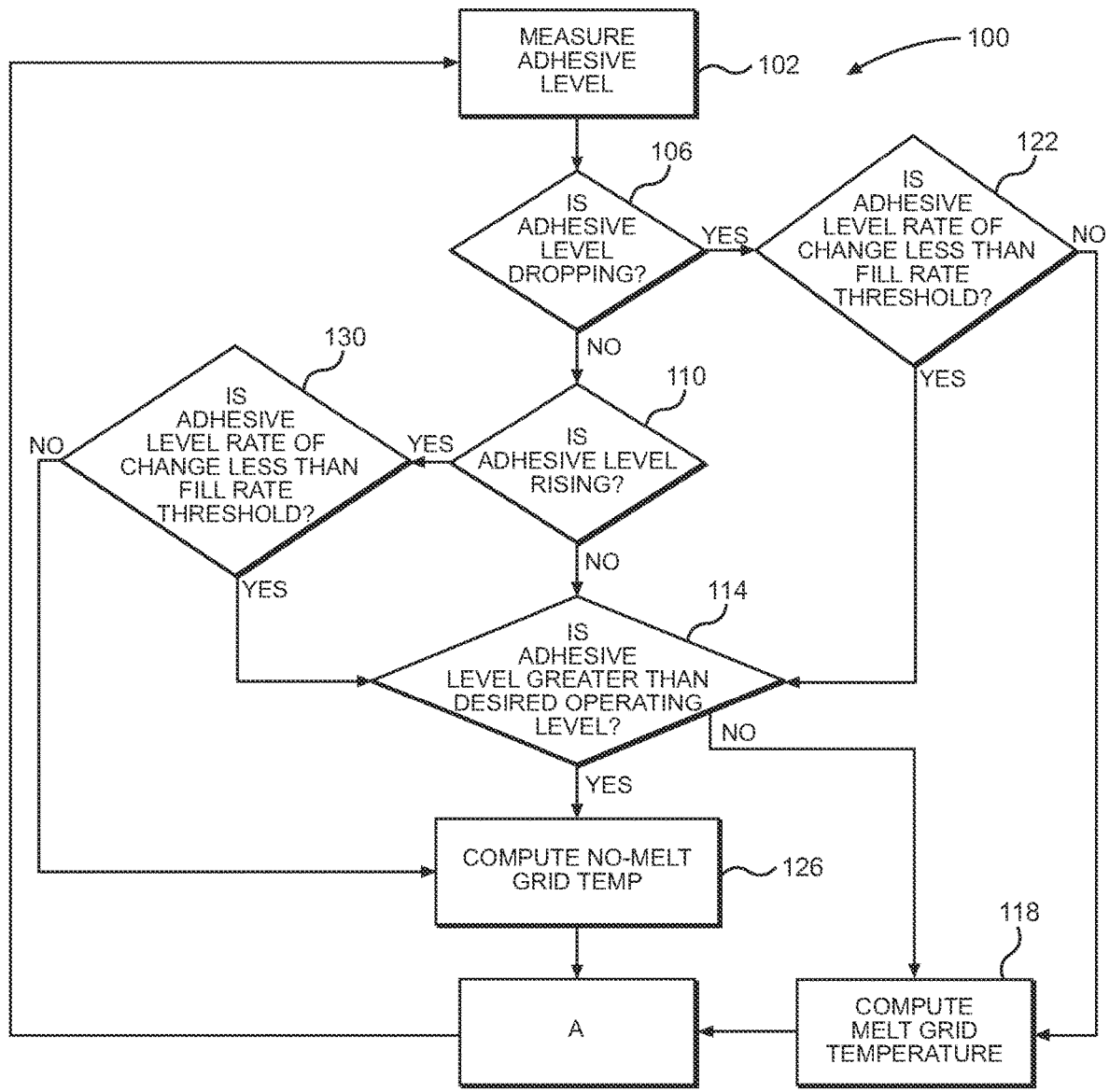
FIG. 5 is a process flow diagram illustrating a method of controlling a level of molten material in a melt system according to an embodiment of the present invention.

Now referring to FIG. 5, a method 100, which can also be referred to as a first PID loop, is shown for actively determining the desired temperature of the melt grid 40 to obtain a particular level of molten material M in the reservoir 30. First, in step 102, the sensor 29 measures the level of molten material M in the reservoir 30 and communicates that level to the controller 402. The sensor 29 can continuously measure the level of molten material M in the reservoir 30, or can intermittently measure the level of molten material M at different intervals in time. For example, the sensor 29 can measure a first level of the molten material M in the reservoir 30 at a first time and measure a second level of the molten material M in the reservoir 30 at a second time subsequent to the first time. The controller 402 can direct the sensor 29 to measure the level of molten material M in a particular mode based upon predetermined instructions stored in the memory unit 404, a decision made by the controller 402 based upon operational features of the melt unit 20 at a particular time, such as solid polymer type, and/or instructions received from an operator of the melting system 10 through the HMI device 408. Regardless of the step the controller 402 is at in the method 100, the display 300 of the HMI device 408 may maintain a constant output depicting the current or most recent level of molten material M as detected by the sensor 29.

After measuring the level of the molten material M in the reservoir 30 for a period of time, the controller 402 can determine the molten fill rate of the molten material M from the melt grid 40 to the reservoir 30. The molten fill rate can be positive or negative, and thus can represent that molten material M is either being added to the reservoir 30 faster than it is being pumped out, or can represent that molten material M is being pumped out of the reservoir 30 faster than it is being added. Alternatively, the molten fill rate can be zero, which represents that input and output rates of molten material M to and from the reservoir 30 are equal. The molten fill rate can be measured in volumetric terms, or in relation to a percent change in the level of melted material M in the reservoir 30 over a period of time. After the controller 402 calculates the molten fill rate, in step 106, the controller 402 determines whether the level of material M in the reservoir 30 is dropping, i.e., the molten fill rate is negative. If the controller 402 determines that the molten fill rate is negative, the controller performs decisional step 122. In decisional step 122, the controller 402 compares the magnitude of the molten fill rate of molten material M entering into the reservoir 30 to a molten fill rate threshold. The molten fill rate threshold is defined as a percentage change in the level of molten material M in the reservoir 30 over a period of time. The magnitude of the percentage change can vary based upon different process-dependent factors, such as the type of solid polymer P being melted or the dimensions of the reservoir 30. Likewise, the period of time can be dependent upon factors such as the dimensions of the reservoir 30. Specifically, a larger reservoir can require that the percentage change in the level of molten material M be measured over a longer period of time, whereas a smaller reservoir 30 can require that the percentage change in the level of molten material M be measured over a shorter period of time. For example, the magnitude of the percentage change in the molten fill rate threshold can be from about 1% to about 5%, while the period of time can be from about 15 seconds to about 90 seconds. In one embodiment, the molten fill rate threshold can be a 3% change in level of molten material M in the reservoir 30 over a period of 60 seconds. The molten fill rate threshold can be retrieved from the memory unit 404 when an operator of the melting system 10 indicates that a particular type of solid polymer P is being added to the melt unit 20, communicated to the controller 402 from operator input into the HMI device 408, or comprise a default level.

If the controller 402 determines that the magnitude of the molten fill rate of molten material M entering the reservoir 30 is greater than the molten fill rate threshold, the controller performs step 118. In step 118, the controller 402 computes a new higher temperature set point for the melt grid 40 with the goal of continuing to provide molten material M to the reservoir 30 at a desired rate. In this step, the controller 402 can compute the new higher temperature set point according to Equation 1, which is displayed below:

$$\text{Temperature Set Point} += [(K_{t1}-C)*K_p] + [\Delta*K_d] \qquad \text{Equation 1}$$

where:
- $K_{t1}$=Target Capacity Level
- C=Current Molten Material Level
- $K_p$=Proportional Term Constant
- $\Delta$=Molten fill rate of Molten material
- $K_d$=Derivative Term Constant.

In this equation, a change in temperature set point is calculated and added to or subtracted from the previous temperature set point. With reference to the list of variables used in Equation 1, the target capacity level $K_{t1}$ is the target adhesive operating level within the reservoir 30. For example, the target capacity level $K_{t1}$ can be 50% capacity of the reservoir 30. The current molten material level C is the current level of molten material M within the reservoir 30 as detected by the sensor 29. The molten fill rate $\Delta$ of molten material M is the rate that molten material M enters the reservoir 30 from the melt grid 40 between two discrete moments in time, such as a first time to a second time. The proportional term constant $K_{t1}$ and the derivative term constant $K_d$ are adhesive and process specific, and are determined through testing. For example, the proportional and derivative term constants $K_{t1}$ and $K_d$ can define one set of values for a particular solid polymer P when step 118 is being performed as opposed to step 126, which will be described further below. When the controller 402 determines that the level of molten material M is dropping in step 106 and that the molten fill rate is greater than a molten fill rate threshold in step 122, the level of molten material M within the reservoir 30 is dropping at an undesirably fast rate. As a result, in this situation the goal of step 118 is to increase the temperature of the melt grid 60 such that a greater amount of solid material P is melted, thus increasing the rate at which molten material M is added to the reservoir 30.

Conversely, if the controller 402 determines that the magnitude of the molten fill rate of molten material M entering the reservoir 30 is less than the molten fill rate threshold in step 122, the controller performs step 114. In step 114, the controller 402 determines whether the current level of molten material M in the reservoir 30 is greater than or less than a desired operating level of the reservoir 30. For example, the desired operating level can be 50% capacity of the reservoir 30, though other capacity levels are contemplated. This desired operating level in step 114 can be the target capacity level $K_{t1}$ as described above in relation to Equation 1. If the controller 402 determines that the current level of molten material M in the reservoir 30 is less than the desired operating level, the controller 402 performs step 118, as previously described. In such a situation, when the controller 402 determines that the level of molten material M is dropping in step 106, the molten fill rate is less than the molten fill rate threshold in step 122, and the level of molten material M in the reservoir 30 is less than the desired operating level in step 114, the level of molten material M is less than desired and is slowly dropping. As a result, in this situation the goal of step 118 is to reverse the dropping or the level of molten material M and thus cause the level of molten material M to begin rising towards the desired operating level. However, if the controller 402 determines that the current level of molten material M in the reservoir 30 is greater than the desired operating level in step 114, the controller performs step 126.

Continuing with FIG. 5, in step 126 the controller 402 calculates a new lower melt grid temperature set point for the molten material M. The new lower melt grid temperature is calculated in step 126 according to Equation 1 as discussed above in relation to step 118. However, when Equation 1 is utilized in connection with step 126, the proportional and derivative term constants $K_{t1}$ and $K_d$ can define a different set of values than when Equation 1 is utilized in step 118. This difference in variable values is attributable to the different purposes of steps 126 and step 118. When step 126 is performed after the controller 402 determines that the adhesive level is dropping in step 106, the molten fill rate is less than the molten fill rate threshold in step 122, and the level of molten material M is greater than the desired operating level in step 114. As a result the level of molten material M is greater than desired, but is slowly dropping. Though the level of molten material M is approaching the desired operating level, the operator of the melting system 10 wants to prevent the level of molten material M from overshooting the desired operating level. As a result, by calculating a new lower melt grid temperature in step 126 using Equation 1 and setting the melt grid 60 to this temperature, the melting of solid material P can be further slowed such that the level of molten material M does not continue to drop and eventually overshoot the desired operating level.

Once the temperature set point is computed in steps 126 or 118, the controller 402 can perform step 128, where the controller 402 compares the new lower melt grid temperature calculated in step 126 or the new higher melt grid temperature calculated in step 118 to a predetermined range of permissible melt grid temperatures. This predetermined range is defined by a minimum melt grid temperature and a maximum melt grid temperature. The minimum melt grid temperature can be a temperature below the melting temperature at which the particular solid polymer P being melted converts to a molten material M. When held at this "no-melt" temperature, the solid polymer P can exist in a substantially gel-like state. The maximum melt grid temperature can be a maximum recommended operating temperature for the solid polymer P provided by the manufacturer of the solid polymer P. This temperature may be a temperature above which various material properties of the solid polymer P are at risk of degradation. When comparing the new temperature set point determined in either step 118 or 126 to the predetermined range, if the controller 402 determines that the new temperature set point is less than the minimum melt grid temperature, the controller 402 can set the temperature set point to be the minimum melt grid temperature. Alternatively, if the controller 402 determines that the new temperature set point is greater than the maximum melt grid temperature, the controller 402 can set the temperature set point as the maximum melt grid temperature. Step 128 thus functions as a control on the calculations performed in steps 126 and 118 by preventing new melt grid temperature set points from being implemented that are outside the predetermined range of acceptable temperatures for a particular solid polymer P. The controller 402 may also be configured to output the temperature set point to the display 300 of the HMI device 408. Both the minimum melt grid temperature and the maximum melt grid temperature can be inputted into the controller 402 through the HMI device 408 by the operator of the melting system 10, or alternatively be recalled from the memory unit 404.

Continuing with FIG. 5, if the controller 402 determines in step 106 that the molten fill rate is not negative, the controller 402 performs step 110. In step 110, the controller 402 determines whether the level of material M in the reservoir 30 is rising, i.e., the molten fill rate is positive. If the controller 402 determines that the molten fill rate is positive, the controller performs decisional step 130. In decisional step 130, the controller 402 compares the magnitude of the molten fill rate of molten material M entering into the reservoir 30 to a molten fill rate threshold, which can be the molten fill rate threshold used in step 122. For example, the molten fill rate threshold in step 130 can also be a 3% change in the level of molten material M in the reservoir 30 over a period of 60 seconds. If the controller 402 determines that the molten fill rate of molten material M is greater than the molten fill rate threshold, the controller 402 performs step 114, as described above. As a result, the controller 402 can then perform either step 126 or 118, both described above, depending on the decision made in step 114. In a situation where the controller 402 subsequently performs step 118 after determining that the molten fill rate is positive in step 110, the molten fill rate is less than the molten fill rate threshold in step 130, and the level of molten material M is less than the desired operating level, the level of molten material M in the reservoir 30 is slowly rising, but the level of molten material M is still less than the desired operating level. By performing step 118, a new higher temperature for the melt grid 60 can be calculated that allows the melt grid 60 to increase the rate at which solid polymer P is being melted, and likewise the rate that molten material M is entering the reservoir 30. Conversely, in a situation where the controller 402 subsequently performs step 126 after determining that the molten fill rate is positive in step 110, the molten fill rate is less than the molten fill rate threshold in step 130, and the level of molten material M is greater than the desired operating level, the level of molten material M in the reservoir 30 is slowly rising, but the level of molten material M is already above the desired operating level. By performing step 126 and calculating a new lower melt grid temperature, the melting of solid material P can be slowed such that the level of molten material M stops rising and eventually begins decreasing towards the desired operating level.

Returning to decisional step 130, if the controller 402 compares the magnitude of the molten fill rate of molten material M entering into the reservoir 30 to the molten fill rate threshold and determines that the molten fill rate is greater than the molten fill rate threshold, the controller 402 performs step 126, as previously described. In this situation, the level of molten material M in the reservoir 30 is quickly rising. By performing step 126 and calculating the new lower melt grid temperature and setting the melt grid 60 to that temperature, the magnitude of the molten fill rate can be decreased so that the level of molten material M in the reservoir 30 does not overshoot the desired operating level if below this level, or conversely does not continue to quickly rise if the level of molten material M in the reservoir 30 is above the desired operating level.

Returning to step 110, if the controller 402 determines that the molten fill rate is not rising, the controller then performs step 114. In this situation, the controller has determined that the molten fill rate is not dropping in step 106 and not rising in step 110. As a result, the molten fill rate is substantially zero. In operation, this signifies that the molten material M is entering the reservoir 30 at substantially the same rate it is being pumped out. In a situation where the molten fill rate is zero, if the controller 402 determines in step 114 that the adhesive level is less than the desired operating level, the controller 402 will perform step 118 and calculate a new higher temperature set point. This will cause the melt grid 60 to melt more solid polymer P, thus increasing the molten fill rate and likewise the level of molten material M in the reservoir 30. Conversely, if the controller 402 determines in step 114 that the adhesive level is greater than the desired operating level, the controller 402 will perform step 126 and calculate new lower melt grid temperature. This will cause the melt grid 60 to melt less solid polymer P, thus decreasing the molten fill rate and likewise the level of molten material M in the reservoir 30.

Upon the completion of step 128, the controller 402 performs method 200, which can also be referred to as the second PID loop. In method 200, the controller 402 monitors and adjusts the temperature of the melt grid 40. Either upon completion of one cycle of method 200 or while method 200 is being commenced, the controller 402 then restarts method 100 by returning to step 102. Method 100 may be performed and repeated continuously or at specified intervals, which can be based upon predetermined instructions stored in the memory unit 404, a decision made by the controller 402 based upon operational features of the melt unit 20 at a particular time, such as solid polymer type, and/or instructions received from an operator of the melting system 10 through the HMI device 408. The method 100 can also be performed at the occurrence of specific events, such as startup or shutdown of the melting system 10 or upon refilling the hopper 60 of the melt unit 20.

Figure 6:
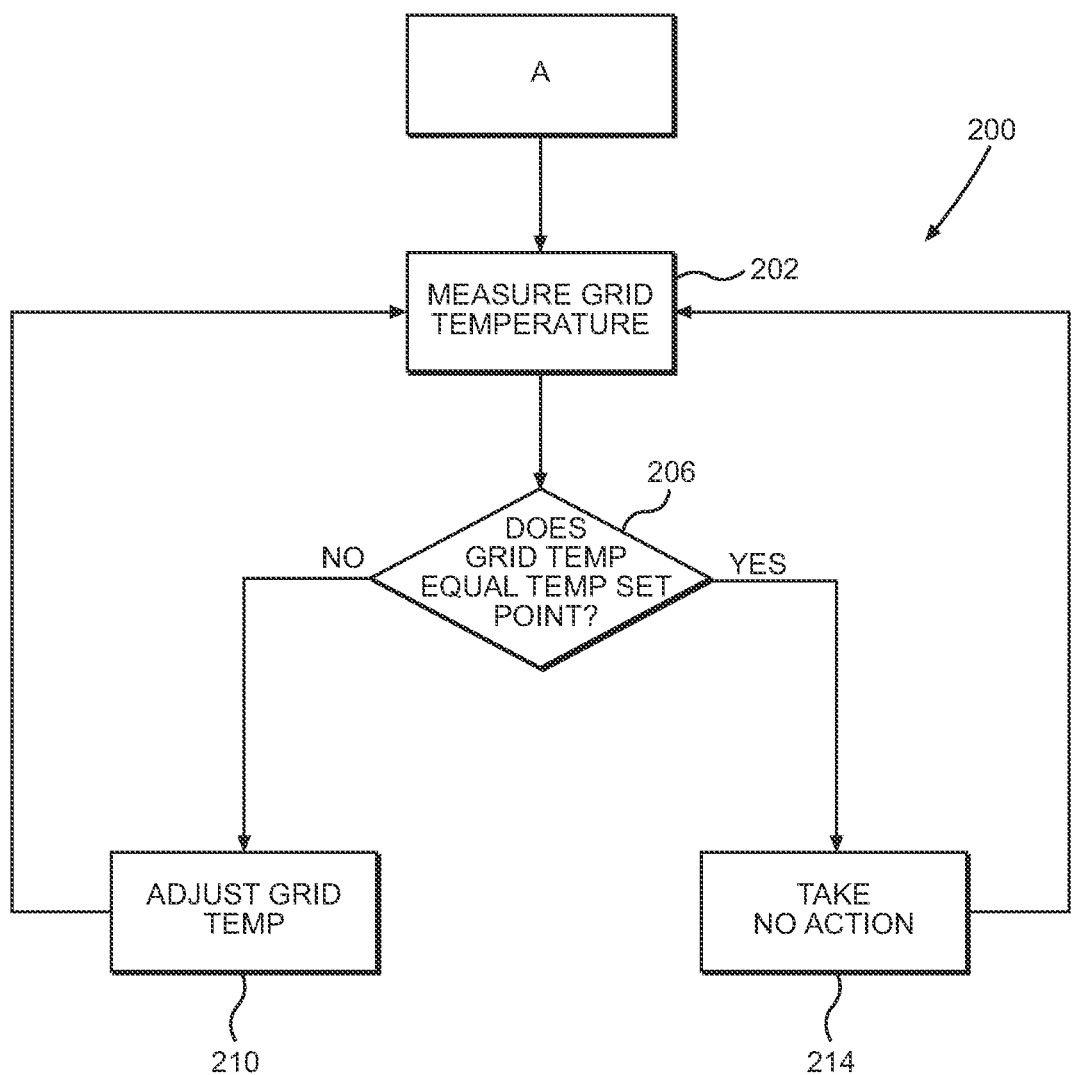
FIG. 6 is a process flow diagram illustrating a method of controlling the temperature of a melt grid according to an embodiment of the present invention.

Referring to FIGS. 5-6, in step 202 of method 200, a temperature sensor 45 measures the temperature of the melt grid 40 and communicates that measurement to the controller 402. The temperature sensor 45 can continuously measure the temperature of the melt grid 40, or can intermittently measure the level of molten material M at different intervals in time. For example, the temperature sensor 45 can measure a first temperature of the melt grid 40 at a first time and measure a second temperature of the melt grid 40 at a second time subsequent to the first time. The controller 402 can direct the temperature sensor 45 to measure the temperature of the melt grid 40 in a particular mode based upon predetermined instructions stored in the memory unit 404, a decision made by the controller 402 based upon operational features of the melt unit 20 at a particular time, such as solid polymer type, and/or instructions received from an operator of the melting system 10 through the HMI device 408. Regardless of the mode in which the temperature sensor 45 is measuring the temperature of the melt grid 40 or at what step the controller 402 is in the method 200, the display 300 of the HMI device 408 may maintain an output depicting the current or most recent temperature of the melt grid 40 as detected by the temperature sensor 45.

After the controller 402 receives the temperature of the melt grid 40 as measured by the temperature sensor 45, the controller 402 performs decisional step 206, in which the controller 402 compares the measured temperature of the melt grid 40 to the temperature set point determined in method 100. The temperature set point may be either the new higher temperature of the melt grid 40 calculated in step 118 of method 100 or the new lower temperature as determined in step 126 of method 100, as described above. If the controller 402 determines in step 206 that the temperature of the melt grid 40 as measured by the temperature sensor 45 is equal to the temperature set point determined in method 100, the controller 402 proceeds to step 214, in which the controller 402 takes no action regarding the temperature of the melt grid 40 and the temperature of the melt grid 40 remains the same. Alternatively, if the controller determines in step 206 that the temperature of the melt grid 40 as measured by the temperature sensor 45 is within a specific range of the temperature set point, the controller 402 proceeds to step 214. The range of temperatures can be based upon predetermined instructions stored in the memory unit 404, a decision made by the controller 402 based upon operational features of the melt unit 20 at a particular time, such as solid polymer type, and/or instructions received from an operator of the melting system 10 through the HMI device 408. After the controller 402 takes no action in step 214, the controller 402 then returns to step 202.

Conversely, if the controller 402 determines in step 206 that the temperature of the melt grid 40 as measured by the temperature sensor 45 is not equal to the temperature set point determined in method 100, the controller 402 proceeds to step 210, in which the controller 402 adjusts the temperature of the melt grid 40 in order to match the temperature set point determined in method 100. Alternatively, if the controller determines in step 206 that the temperature of the melt grid 40 as measured by the temperature sensor 45 is not within a specific range of the temperature set point, the controller 402 proceeds to step 210. In step 210, the controller 402 changes the operation of the heating units contained in the melt unit 20 that heat the melt grid 40 in order to raise or lower the operating temperature of the melt grid 40 so that it matches the temperature set point. This change in operation can be based upon predetermined instructions stored in the memory unit 404, a decision made by the controller 402 based upon operational features of the melt unit 20 at a particular time, such as solid polymer type, and/or instructions received from an operator of the melting system 10 through the HMI device 408. Additionally, this change in operation can also be based upon factors related to the geometry, material type, and design of the melt grid 40.

Like the method 100, upon completion of steps 214 or 210 of the method 200, the controller 402 can then restart method 200 by returning to step 202. Method 200 may be performed and repeated continuously or at specified intervals, which can be based upon predetermined instructions stored in the memory unit 404, a decision made by the controller 402 based upon operational features of the melt unit 20 at a particular time, such as solid polymer type, and/or instructions received from an operator of the melting system 10 through the HMI device 408. The method 200 can also be performed at the occurrence of specific events, such as startup or shutdown of the melting system 10 or upon refilling the hopper 60 of the melt unit 20. When returning to step 202, the method 200 can be performed again using the same temperature set point as the last iteration of method 200, or can be performed using a new temperature set point. As a result, methods 100 and 200 can be performed and repeated independently from each other.

Now referring to FIGS. 7A-7C, method 100 will be further discussed in connection with the display 300 of the HMI device 408. The display 300 can comprise a screen of a tablet, cell phone, laptop, or other computing device configured to display a graph that shows operational features of the melting system 10 over time. For example, the graph shown on display 300 can show the level of molten material M in the reservoir 30 using line 306, the level of solid polymer P in the hopper 60 using line 310, and the current temperature of the melt grid 40 as sensed by sensor 29 using line 314. In addition to these, the display 308 can also display a variety of other aspects and measurements of the melting system 10. For instance, the display 300 can depict the current temperature of the melt grid 40 as sensed by a temperature sensor 29 in box 302. However, it is contemplated that the display 308 can show any other measured or static aspect of the melting system 10 as desired, such as a numerical temperature in the hopper 60, numerical fill level of the hopper 60, etc.

FIG. 7A in particular depicts the melt unit 20 before and immediately after beginning operation. Before operation, the level of molten material M in the reservoir 30 remains constant, as shown by portion 318 of line 306, because the melt grid 40 is not melting any of the solid polymer P into molten material M. Likewise, the level of solid polymer P in the hopper 60 remains constant as shown by portion 322 of line 310, as solid polymer P is not leaving the hopper 60. Additionally, the temperature of the melt grid 40 as sensed by the temperature sensor 29 remains constant. During a period where the melt unit 20 is idle, the melt grid 40 may be maintained at the first no-melt temperature, which maintains the solid polymer P in the hopper 60 in a substantially gel-like state. This can be beneficial when restarting operation of the melt unit 20, as the solid polymer P will already be at an elevated stated and the time required for melting the solid polymer P will be decreased. This allows for a longer operational time between periods of inactivity. If the controller 402 determines that the idle time has commenced for a predetermined period of time, the controller 402 may direct the temperature of the melt grid 40 to drop below the no-melt temperature to an extended idle temperature.

After some time, the operator of the melting system 10 may initiate operation of the melt unit 20 by pumping molten material M from the reservoir 30. As a result, the level of molten material M within the reservoir 30 will decrease, as indicated by portion 330 of line 306. Now referring to FIG. 7B, in response to the decrease of molten material M in the reservoir 30, the temperature of the melt grid 40 will increase as shown by portion 342 of line 314 to heat solid polymer P in the hopper 60 into molten material M. This temperature increase can occur as a result of actions taken by the controller 402 in methods 100 and 200, as described above, as well as instructions provided by the operator of the melting system 10 to the controller 402 through the HMI device 408. However, the level of solid polymer P in the hopper 60 will remain constant until the temperature of the melt grid 40 rises sufficiently to cause the solid polymer P to begin melting.

In response to the temperature increase of the melt grid 40, solid polymer P in the hopper 60 will begin transitioning into molten material M and begin flowing through the melt grid 40 to the reservoir 30. The level of solid polymer P in the hopper will likewise decrease as molten material M flows to the hopper 60. In anticipation of this, the controller 402 may produce an alert via the HMI device 408 that notifies the operator of the melting system 10 that additional solid polymer P should be added to the hopper 60. The portion 338 of line 310 indicates the increase in the level of solid polymer P in the hopper 60 due to a manual refill by the operator. Alternatively, the hopper 60 can be attached to a remote filling system (not shown) which can automatically replenish the supply of solid polymer P in the hopper upon instruction from the controller 402. Adding additional solid polymer P to the hopper 60 will cause a sharp increase of molten material M into the reservoir 30, as shown by portion 334 of line 306, due to the increased weight on semi-molten material at the bottom of the hopper 60 near the melt grid 40, which can force a surge of molten and semi-molten material through the melt grid 40.

Figure 7B:
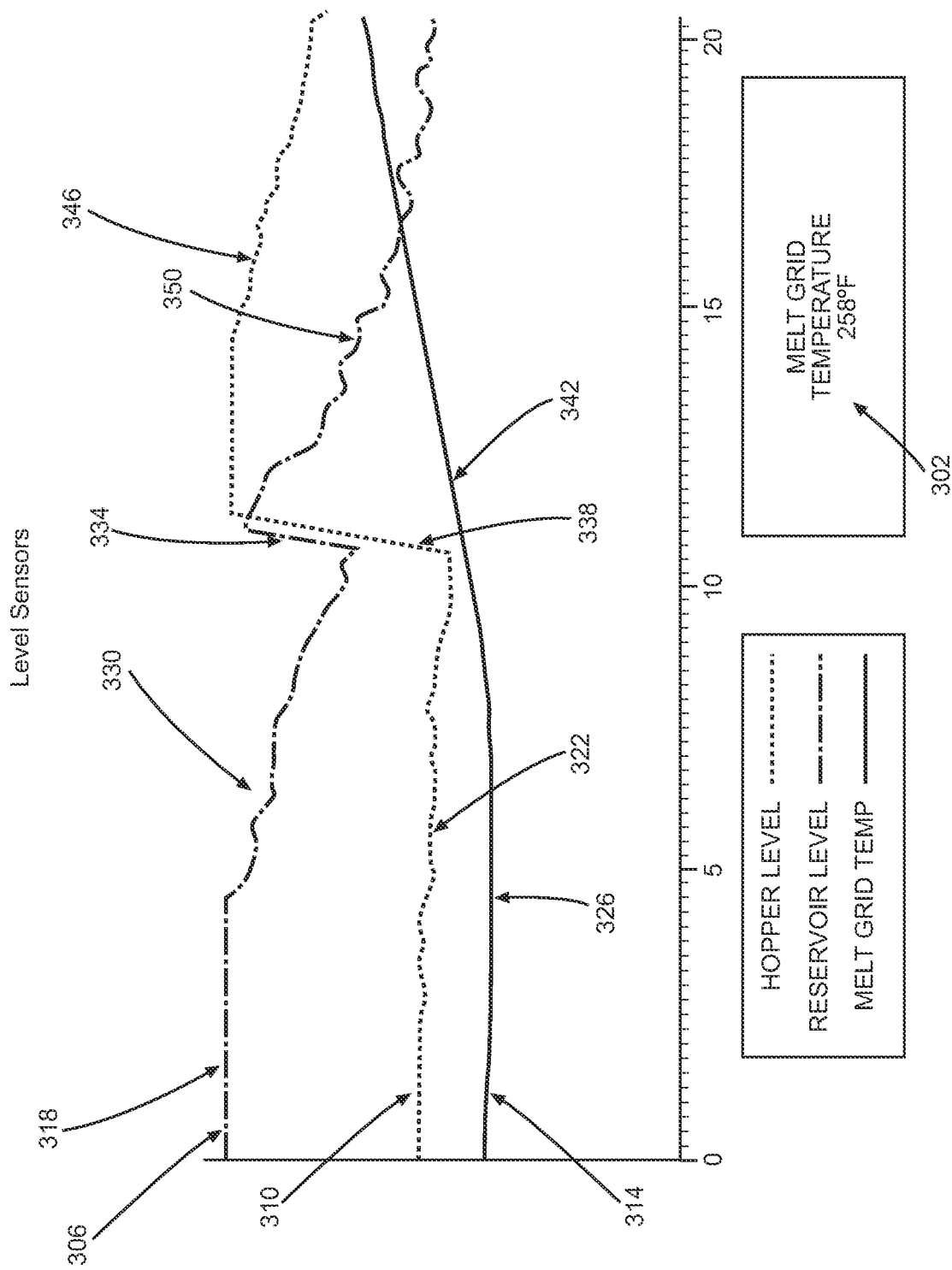
FIG. 7B is the display shown in FIG. 7A showing a graph that depicts reservoir level, hopper level, and melt grid temperature over a second period of time for an embodiment of the present invention.
Figure 7C:
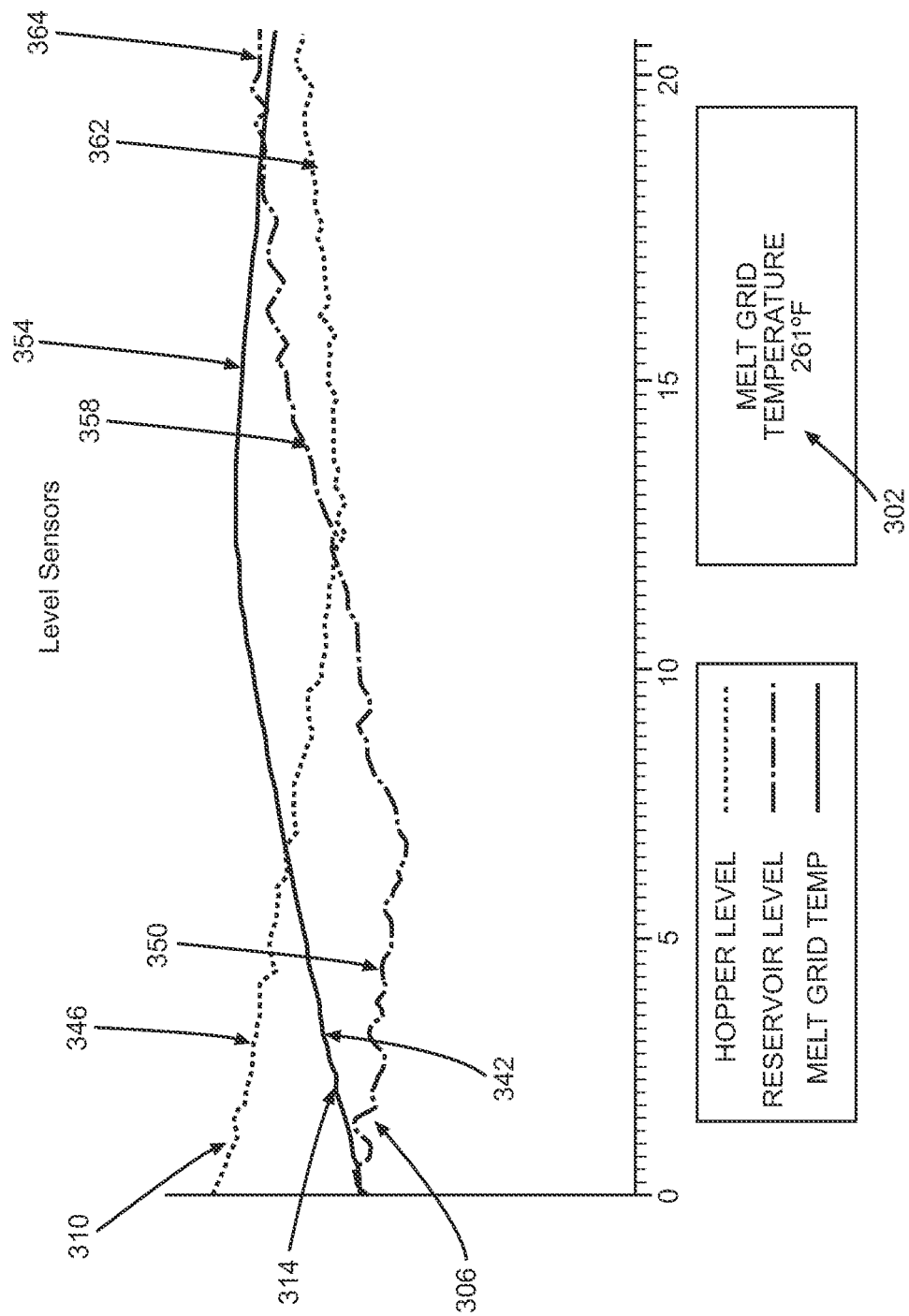
FIG. 7C is the HMI device display shown in FIG. 7A showing a graph that depicts reservoir level, hopper level, and melt grid temperature over a third period of time for an embodiment of the present invention.

Continuing with FIGS. 7B-7C, after the sharp increase in the level of molten material M in the reservoir 30, the molten material M will again continue to be steadily pumped from the reservoir 30, as indicated by portion 350 of line 306.

Likewise, the level of solid polymer P in the hopper 60 will steadily drop as the solid polymer P is converted to molten material M, as indicated by portion 346 of line 310. During this time, the temperature of the melt grid 40 will continue to gradually increase, as shown by portion 342 of line 314. Eventually, the melt grid 40 will heat to a point where it starts to melt more solid polymer P from the hopper 60 into liquid material M that flows to the reservoir 30 than is pumped out of the reservoir 30. As such, as indicated by portion 358 of line 306, the molten fill rate of the reservoir 30 will become positive and the level of molten material M in the reservoir 30 will gradually rise. During this time, the level of solid polymer P in the hopper 60 may "settle in" prior to an additional fill cycle. After the level of molten material M has risen in the reservoir 30 for an amount of time, the controller 402 may direct the temperature of the melt grid 40 to begin decreasing, as shown by portion 354 of line 314. This is to prevent the level of molten material M within the reservoir 30 from overshooting the desired operating level, as discussed above in connection with method 100. Accordingly, in response to the decrease in temperature of the melt grid 40, the level of molten material M in the reservoir 30 will begin to level off, as shown by portion 364 of line 306.

The use of the above-mentioned methods allows the melting system 10 to exact closed-loop, real time control over the amount of material melted by the melt grid 40 at any particular moment without overshooting a target material level, thus providing true melt-on-demand performance. Management of the temperature of the melt grid 40 and the material melt rate allows the operator to utilize the low thermal conductivity and inherent insulating properties of the solid polymer P in the melt unit 20, as the solid polymer P creates a thermal barrier (or thermal valve) that prevents upper migration of heat from the reservoir 30 to the solid polymer P stored in the hopper 60 above. This prevents an operator of the melting system from being exposed to noxious fumes from the molten material M and allows for the on-board storage of significant amounts of solid polymer P, rather than the off-board storage required in previous melt systems. Additionally, this allows the solid polymer to be melted in a first-in first-out process.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A method for controlling a level of molten material received in a reservoir of a melt system from a melt grid configured to heat a solid polymer into a molten material, the method comprising:
    receiving a first level of the molten material from a sensor in the reservoir at a first time;
    receiving a second level of the molten material from the sensor at a second time subsequent to the first time;
    determining a molten fill rate of the molten material at which the molten material enters the reservoir based on the first level and the second level of the molten material;
    comparing a magnitude of the molten fill rate of the molten material to a molten fill rate threshold;
    determining a temperature set point for the melt grid based on at least the molten fill rate and if the molten fill rate is determined to be greater than or less than the molten fill rate threshold; and
    adjusting an operating temperature of the melt grid to match the temperature set point.

2. The method of claim 1, wherein determining the molten fill rate includes determining that the molten fill rate is negative.

3. The method of claim 2, wherein comparing the molten fill rate of the molten material to the molten fill rate threshold comprises determining that the molten fill rate of the molten material is less than the molten fill rate threshold, the method further comprising:
    comparing the second level of the molten material to a desired operating level.

4. The method of claim 3, wherein:
    comparing the second level of the molten material to the desired operating level comprises determining that the second level is greater than the desired operating level; and
    determining the temperature set point for the melt grid comprises calculating a lower temperature set point for the melt grid based on the second level of the molten material and the molten fill rate of the molten material from the first level to the second level.

5. The method of claim 3, wherein:
    comparing the second level of the molten material to the desired operating level comprises determining that the second level is less than the desired operating level; and
    determining the temperature set point for the melt grid comprises calculating a higher temperature set point for the melt grid based on the second level of the molten material and the molten fill rate of the molten material from the first level to the second level.

6. The method of claim 2, wherein:
    comparing the molten fill rate of the molten material to the molten fill rate threshold comprises determining that the molten fill rate of the molten material is greater than the molten fill rate threshold; and
    determining the temperature set point for the melt grid comprises calculating a higher temperature set point for the melt grid based on the second level of the molten material and the molten fill rate of the molten material from the first level to the second level.

7. The method of claim 1, wherein determining the molten fill rate includes determining that the molten fill rate is positive.

8. The method of claim 7, wherein comparing the molten fill rate of the molten material to the molten fill rate threshold comprises determining that the molten fill rate of the molten material is less than the molten fill rate threshold, the method further comprising:
    comparing the second level of the molten material to a desired operating level.

9. The method of claim 8, wherein:
    comparing the second level of the molten material to the desired operating level comprises determining that the second level is greater than the desired operating level; and
    determining the temperature set point for the melt grid comprises calculating a lower temperature set point for the melt grid based on the second level of the molten material and the molten fill rate of the molten material from the first level to the second level.

10. The method of claim 8, wherein:
comparing the second level of the molten material to the desired operating level comprises determining that the second level is less than the desired operating level; and
determining the temperature set point for the melt grid comprises calculating a higher temperature set point for the melt grid based on the second level of the molten material and the molten fill rate of the molten material from the first level to the second level.

11. The method of claim 7, wherein:
comparing the molten fill rate of the molten material to the molten fill rate threshold comprises determining that the molten fill rate of the molten material is greater than the molten fill rate threshold; and
determining the temperature set point for the melt grid comprises calculating a lower temperature set point for the melt grid based on the second level of the molten material and the molten fill rate of the molten material from the first level to the second level.

12. The method of claim 1, wherein the molten fill rate threshold is a 3% level change of the molten material in the reservoir over a period of time.

13. The method of claim 12, wherein the period of time is between about 15 seconds and about 90 seconds.

14. The method of claim 1, wherein determining the temperature set point is performed according to the equation:

$$\text{Temperature Set Point} += [(K_{t1}-C)*K_p] + [\Delta*K_d]$$

where:
$K_{t1}$=Target Capacity Level
C=Current Molten Material Level
$K_p$=Proportional Term Constant
$\Delta$=Molten fill rate of Molten Polymer
$K_d$=Derivative Term Constant.

15. The method of claim 14, wherein the target capacity level is 50 percent capacity of the reservoir.

16. The method of claim 1, further comprising:
comparing the temperature set point for the melt grid to a predetermined range of permissible melt grid temperatures defined by a minimum melt grid temperature and a maximum melt grid temperature.

17. The method of claim 16, wherein the minimum melt grid temperature is a no-melt temperature of the molten material.

18. The method of claim 16, wherein the maximum temperature is a maximum recommended operating temperature for the molten material.

19. A melt system for melting solid polymer into molten material, the melt system comprising:
a hopper for receiving the solid polymer:
a reservoir for receiving the molten material;
a melt grid disposed between the hopper and the reservoir and configured to heat the solid polymer into the molten material;
a sensor disposed in the reservoir for detecting a level of the molten material in the reservoir; and
a controller in electrical communication with the melt grid and the sensor for controlling the level of molten material in the reservoir, wherein the controller is configured to:
receive a first level of the molten material from a sensor in the reservoir at a first time;
receive a second level of the molten material from the sensor at a second time subsequent to the first time;
determine a molten fill rate of the molten material at which the molten material enters the reservoir based on the first level and the second level of the molten material;
compare a magnitude of the molten fill rate of the molten material to a molten fill rate threshold;
determine a temperature set point for the melt grid based on at least the molten fill rate and if the molten fill rate is determined to be greater than or less than the molten fill rate threshold; and
adjust an operating temperature of the melt grid to match the temperature set point.

20. The melt system of claim 19, wherein the controller is further configured to:
compare the second level of the molten material to a desired operating level.

21. The melt system of claim 20, wherein the controller is further configured to:
compare the second level of the molten material to the desired operating level by determining that the second level is greater than the desired operating level; and
determine the temperature set point for the melt grid by setting the temperature set point for the melt grid to be less than a melting temperature of the molten material.

22. The melt system of claim 20, wherein the controller is further configured to:
compare the second level of the molten material to the desired operating level by determining that the second level is less than the desired operating level; and
determine the temperature set point for the melt grid by calculating the temperature set point for the melt grid based on the second level of the molten material and the molten fill rate of the molten material from the first level to the second level.

23. The melt system of claim 19, wherein the molten fill rate threshold is a 3% level change of the molten material in the reservoir over a period of time that is about 60 seconds.

24. The melt system of claim 19, wherein the controller is further configured to:
measure an operating temperature of the melt grid;
compare the operating temperature of the melt grid to the temperature set point;
compare the temperature set point for the melt grid to a predetermined range of permissible melt grid temperatures defined by a minimum melt grid temperature and a maximum melt grid temperature, wherein the minimum melt grid temperature is a no-melt temperature of the molten material and the maximum melt grid temperature is a maximum recommended operating temperature for the molten material; and
(a) if the temperature set point is within the predetermined range of permissible melt grid temperatures and the operating temperature of the melt grid is determined to be greater than or less than the temperature set point:
adjust the operating temperature of the melt grid to match the temperature set point;
(b) if the temperature set point is less than the minimum melt grid temperature and the operating temperature of the melt grid is determined to be greater than or less than the temperature set point:
set the temperature set point to be the minimum melt grid temperature and adjusting the operating temperature of the melt grid to match the temperature set point set to be the minimum melt grid temperature; and
(c) if the temperature set point is greater than the maximum melt grid temperature and the operating temperature of the melt grid is determined to be greater than or less than the temperature set point:
set the temperature set point to be the maximum melt grid temperature and adjusting the operating temperature of the melt grid to match the temperature set point set to be the maximum melt grid temperature.

25. The method of claim 1, further comprising:
measuring an operating temperature of the melt grid;
comparing the operating temperature of the melt grid to the temperature set point;
comparing the temperature set point for the melt grid to a predetermined range of permissible melt grid temperatures defined by a minimum melt grid temperature and a maximum melt grid temperature, wherein the minimum melt grid temperature is a no-melt temperature of the molten material and the maximum melt grid temperature is a maximum recommended operating temperature for the molten material; and
(a) if the temperature set point is within the predetermined range of permissible melt grid temperatures and the operating temperature of the melt grid is determined to be greater than or less than the temperature set point:
adjusting the operating temperature of the melt grid to match the temperature set point;
(b) if the temperature set point is less than the minimum melt grid temperature and the operating temperature of the melt grid is determined to be greater than or less than the temperature set point:
setting the temperature set point to be the minimum melt grid temperature and adjusting the operating temperature of the melt grid to match the temperature set point set to be the minimum melt grid temperature; and
(c) if the temperature set point is greater than the maximum melt grid temperature and the operating temperature of the melt grid is determined to be greater than or less than the temperature set point:
setting the temperature set point to be the maximum melt grid temperature and adjusting the operating temperature of the melt grid to match the temperature set point set to be the maximum melt grid temperature.

* * * * *